(12) United States Patent
Park et al.

(10) Patent No.: US 10,346,506 B2
(45) Date of Patent: Jul. 9, 2019

(54) EVENT SIGNAL PROCESSING METHOD AND APPARATUS

(71) Applicant: SAMSUNG ELECTRONICS CO., LTD., Suwon-si (KR)

(72) Inventors: Jin-Man Park, Yongin-si (KR); Eric Hyunsurk Ryu, Hwaseong-si (KR); Keun Joo Park, Seoul (KR); Hyunku Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 13 days.

(21) Appl. No.: 15/667,214

(22) Filed: Aug. 2, 2017

(65) Prior Publication Data
US 2018/0039601 A1 Feb. 8, 2018

(30) Foreign Application Priority Data
Aug. 2, 2016 (KR) .................. 10-2016-0098524

(51) Int. Cl.
| | | |
|---|---|---|
| *G06F 3/01* | (2006.01) | |
| *G06K 9/20* | (2006.01) | |
| *G06K 9/52* | (2006.01) | |
| *G06F 17/18* | (2006.01) | |
| *G06T 7/269* | (2017.01) | |
| *G08B 13/14* | (2006.01) | |

(Continued)

(52) U.S. Cl.
CPC ............ *G06F 17/141* (2013.01); *G06F 3/017* (2013.01); *G06F 3/04842* (2013.01); *G06F 17/18* (2013.01); *G06K 9/00355* (2013.01); *G06K 9/20* (2013.01); *G06K 9/522* (2013.01); *G06K 9/00771* (2013.01); *G06T 7/269* (2017.01); *G08B 13/1436* (2013.01)

(58) Field of Classification Search
CPC .................................................. G08B 13/1961
See application file for complete search history.

(56) References Cited

U.S. PATENT DOCUMENTS 9,143,680 B2 * 9/2015 Lee ................ H04N 5/23229
9,213,902 B2 12/2015 Benosman et al.
(Continued)

FOREIGN PATENT DOCUMENTS

KR 10-2012-0113847 A 10/2012
KR 10-2013-0040517 A 4/2013
(Continued)

OTHER PUBLICATIONS

T. Delbruck, Frame-free dynamic digital vision, Proceedings of Intl. Symp. on Secure-Life Electronics, Advanced Electronics for Quality Life and Society, 2008, p. 21-26 (Year: 2008).*
(Continued)

*Primary Examiner* — Andrew Caldwell
*Assistant Examiner* — Emily E Larocque
(74) *Attorney, Agent, or Firm* — Sughrue Mion, PLLC

(57) ABSTRACT

Provided is an event signal processing method and apparatus. The event signal processing method includes acquiring, from an event based sensor, coordinates of an active pixel corresponding to an event and a timestamp corresponding to the event; mapping the event to a target voxel included in a three-dimensional (3D) grid based on the coordinates of the active pixel and the timestamp; and updating a value of the target voxel based on the event.

18 Claims, 7 Drawing Sheets

(51) Int. Cl.
*G06F 17/14* (2006.01)
*G06F 3/0484* (2013.01)
*G06K 9/00* (2006.01)

(56) References Cited

U.S. PATENT DOCUMENTS

| | | | |
|---|---|---|---|
| 9,761,020 B2* | 9/2017 | Prevrhal | G06T 11/006 |
| 9,844,325 B2* | 12/2017 | Manzke | A61B 5/0816 |
| 2009/0201146 A1 | 8/2009 | Ludenberg | |
| 2015/0355721 A1 | 12/2015 | Moore et al. | |
| 2016/0078001 A1 | 3/2016 | Wang et al. | |
| 2016/0094814 A1* | 3/2016 | Gousev | G06K 9/6267 |
| | | | 348/143 |

FOREIGN PATENT DOCUMENTS

| | | |
|---|---|---|
| KR | 10-2015-0014342 A | 2/2015 |
| KR | 10-2015-0081801 A | 7/2015 |
| KR | 10-2015-0120124 A | 10/2015 |
| KR | 10-2016-0024307 A | 3/2016 |
| KR | 10-2014-0042016 A | 4/2016 |
| KR | 10-2016-0038693 A | 4/2016 |

OTHER PUBLICATIONS

E.Y. Ahn, Dynamic Vision Sensor Camera Based Bare Hand Gesture Recognition, IEEE, 2011, p. 1-8 (Year: 2011).*

* cited by examiner

EVENT SIGNAL PROCESSING METHOD AND APPARATUS

CROSS-REFERENCE TO RELATED APPLICATION

This application claims priority from Korean Patent Application No. 10-2016-0098524, filed on Aug. 2, 2016 in the Korean Intellectual Property Office, the disclosure of which is incorporated herein by reference in its entirety.

BACKGROUND

1. Field

Methods and apparatuses consistent with exemplary embodiments relate to a method and apparatus for processing an event signal.

2. Description of the Related Art

Technology for processing a signal acquired from a sensor is required to identify an object, such as a face, a person, etc., or to recognize a change in an activity or a posture of the object, an illumination, etc. A frame image based sensor outputs signals associated with frames of consecutive images. In the case of detecting an activity using a color image sensor (CIS), a scheme of distinguishing a motionless background and a moving object by analyzing frames of consecutive images is employed. To process signals output from the frame image based sensor, additional operations for creating frames of consecutive images, processing each frame to detect an activity, measuring a change between frames, and maintaining a robust performance against various changes in a background and an illumination and sensor noise are being conducted. To secure a computing power for processing such operations, load of hardware, relatively high consumption power, and cost of a configuration device may increase.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a method of processing an event signal, the method including acquiring, from an event based sensor, coordinates of an active pixel corresponding to an event and a timestamp corresponding to the event; mapping the event to a target voxel included in a three-dimensional (3D) grid based on the coordinates of the active pixel and the timestamp; and updating a value of the target voxel based on the event.

The mapping may include converting the coordinates of the active pixel and the timestamp into coordinates of the target voxel based on a size of the 3D grid and a resolution of the event based sensor.

The 3D grid may include voxels identified based on a coordinate of x axis, a coordinate of y axis, and a coordinate of t axis, and the size of the 3D grid may be defined based on a number of voxels of x axis, a number of voxels of y axis, and a number of voxels oft axis.

The updating may include updating the value of the target voxel based on a number of events that are mapped to the target voxel.

The updating may include determining the value of the target voxel as a preset value in response to the number of events being greater than a threshold.

The event signal processing method may further include detecting an activity associated with the events in response to the number of events being greater than a threshold.

The active pixel at which the event is detected among sensing pixels of the event based sensor may be configured to output an activation signal, and the event based sensor may be configured to output an event signal that includes an address of the active pixel and the timestamp indicating a time at which the event is detected, based on the activation signal. The acquiring may include acquiring the event signal from the event based sensor; acquiring the coordinates of the active pixel among the sensing pixels based on the event signal; and acquiring the timestamp based on the event signal.

The event signal processing method may further include detecting an activity associated with events based on values of voxels of the 3D grid; and switching a mode of the event based sensor in response to the detected activity. The mode may include at least one of a low energy mode that is a state in which the event is detected at a portion of the sensing pixels and a full resolution mode that is a state in which the event is detected at all of the sensing pixels.

The event signal processing method may further include creating a new 3D grid based on spatial correlations or temporal correlations between a second target voxel among voxels of the 3D grid and neighboring voxels of the second target voxel.

The creating the new 3D grid may include measuring spatial correlations between the second target voxel and neighboring voxels having the same coordinate of t axis as that of the second target voxel among the voxels of the 3D grid; and updating a value of a voxel corresponding to the second target voxel among voxels of the new 3D grid based on the measured spatial correlations.

The creating the new 3D grid may include measuring temporal correlations between the second target voxel and neighboring voxels having the same coordinate of x axis and coordinate of y axis as those of the second target voxel among the voxels of the 3D grid; and updating a value of a voxel corresponding to the second target voxel among voxels of the new 3D grid based on the measured temporal correlations.

The event signal processing method may further include determining events corresponding to contiguous voxels as a noise in response to values of the contiguous voxels having the same coordinate of x axis and coordinate of y axis among voxels of the new 3D grid created based on the temporal correlations being equal to each other.

The event signal processing method may further include determining events corresponding to contiguous voxels as an activity in response to values of the contiguous voxels having the same coordinate of x axis and coordinate of y axis among voxels of the new 3D grid created based on the temporal correlations being greater than a threshold and a number of the contiguous voxels being greater than a preset number.

The creating the new 3D grid may include calculating a difference between a value of the second target voxel and a value of a neighboring voxel; comparing the calculated difference to a threshold; and updating a value of a voxel corresponding to the second target voxel among voxels of the new 3D grid based on a comparison result.

The event signal processing method may further include detecting an activity in response to a number of voxels having a value greater than a threshold among voxels of the new 3D grid being greater than a preset number.

The event signal processing method may further include extracting a feature corresponding to events based on values of voxels of the new 3D grid; and classifying a type of an activity corresponding to the events based on the feature.

According to an aspect of another exemplary embodiment, there is provided an event signal processing apparatus including a processor configured to: acquire, from an event based sensor, coordinates of an active pixel corresponding to an event and a timestamp corresponding to the event; map the event to a target voxel included in a 3D grid based on the coordinates of the active pixel and the timestamp; and update a value of the target voxel based on the event.

The processor may be further configured to convert the coordinates of the active pixel and the timestamp into coordinates of the target voxel based on a size of the 3D grid and a resolution of the event based sensor, the 3D grid may include voxels identified based on a coordinate of x axis, a coordinate of y axis, and a coordinate of t axis, and the size of the 3D grid may be defined based on a number of voxels of x axis, a number of voxels of y axis, and a number of voxels of t axis.

According to an aspect of another exemplary embodiment, there is provided an event signal processing apparatus including a processor configured to: acquire a 3D grid that is defined based on a number of events mapped to voxels among events detected at an event based sensor; and create a new 3D grid based on spatial correlations or temporal correlations between a target voxel among voxels of the 3D grid and neighboring voxels of the target voxel.

According to an aspect of another exemplary embodiment, there is provided an event signal processing method including receiving, from an event based sensor that detects an event, event signals comprising information regarding an active pixel corresponding to the event, mapping the event to a target voxel included in a three-dimensional (3D) grid based on the information included in the event signals, acquiring the 3D grid that is defined based on a number of events mapped to voxels among events detected at the event based sensor, and creating a new 3D grid based on spatial correlations or temporal correlations between a target voxel among voxels of the 3D grid and neighboring voxels of the target voxel.

The information included in the event signals may include coordinates of the active pixel corresponding to the event and a timestamp corresponding to the event.

The information may further include a type of the event.

The event signal processing method may further include determining events corresponding to contiguous voxels as a noise in response to values of the contiguous voxels having the same coordinate of x axis and coordinate of y axis among voxels of the new 3D grid created based on the temporal correlations being equal to each other.

The event signal processing method may further include determining events corresponding to contiguous voxels as an activity in response to values of the contiguous voxels having the same coordinate of x axis and coordinate of y axis among voxels of the new 3D grid created based on the temporal correlations being greater than a threshold and a number of the contiguous voxels being greater than a preset number.

BRIEF DESCRIPTION OF THE DRAWINGS

The above and/or other aspects will be more apparent from the following detailed description of certain exemplary embodiments, taken in conjunction with the accompanying drawings, in which.

DETAILED DESCRIPTION

Figure 1:
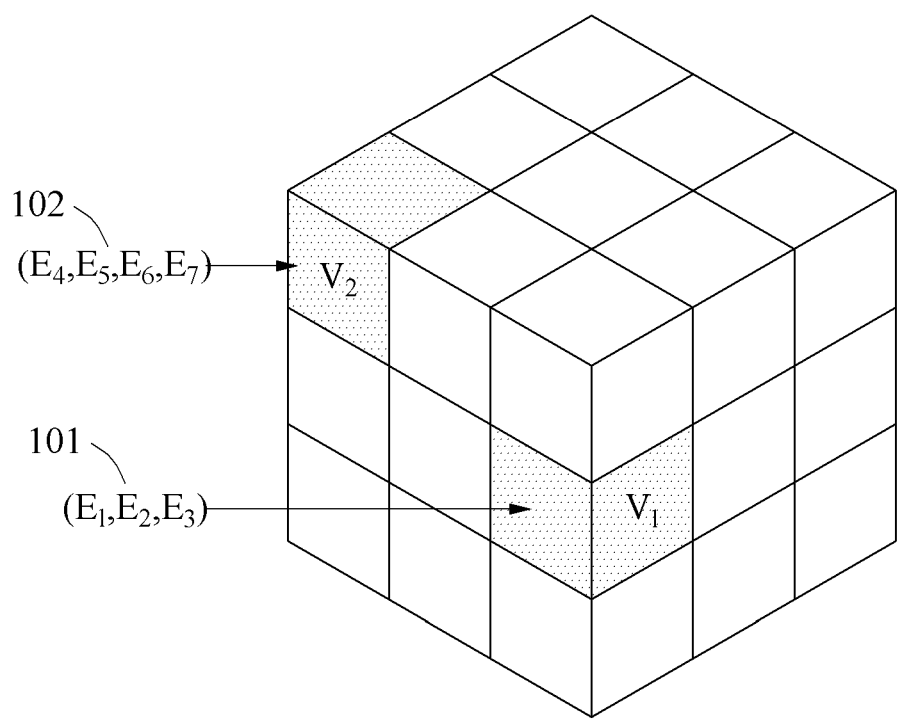
FIG. 1 illustrates an example of describing an event signal processing process according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

It will be understood that the terms "comprises" and/or "comprising" used herein specify the presence of stated features or components, but do not preclude the presence or addition of one or more other features or components. In addition, the terms such as "unit", "-er (-or)", and "module" described in the specification refer to an element for performing at least one function or operation, and may be implemented in hardware, software, or the combination of hardware and software.

The following detailed structural or functional description of exemplary embodiments is provided as an example only and various alterations and modifications may be made to the exemplary embodiments. Accordingly, the exemplary embodiments are not construed as being limited to the disclosure and should be understood to include all changes, equivalents, and replacements within the technical scope of the disclosure.

Although terms of "first" or "second" may be used to describe components, the components are not limited to the terms. These terms should be used only to distinguish one component from another component. For example, a "first" component may be referred to as a "second" component, or similarly the "second" component may be referred to as the "first" component.

It should be noted that if one component is "connected", "coupled", or "joined" to another component, it can be directly connected, coupled, or joined to the other component or intervening components may be present. On the contrary, it should be noted that if one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise.

Exemplary embodiments may be configured in various types of products, for example, a personal computer (PC), a laptop computer, a tablet computer, a smartphone, a television (TV), a smart electronic device, a smart vehicle, a kiosk, a wearable device, and the like. For example, exemplary embodiments may be employed to recognize a user in a smartphone, a mobile device, a smart home system, and the like. Exemplary embodiments may be applied to a payment service through recognition of a user. Also, exemplary embodiments may be applied to a smart vehicle system to recognize a user and to automatically start.

FIG. 1 illustrates an example of describing an event signal processing process according to an exemplary embodiment.

Referring to FIG. 1, an event signal processing apparatus according to an exemplary embodiment may map events 101 and 102 identified based on an address of a pixel and a sensing time to voxels $V_1$ and $V_2$ of a three-dimensional (3D) grid in which a space and a time are divided into scalable sizes. The event signal processing apparatus may store the 3D grid in which the events 101 and 102 are mapped to the voxels $V_1$ and $V_2$, respectively. The event signal processing apparatus may measure an occurrence frequency of events or analyze a variation of events. The event signal processing apparatus may identify an object, such as a face, a person, and the like, or recognize a change in an activity or a posture of the object, a change in an illumination, and the like, by determining whether a meaningful activity associated with the events has occurred, by classifying a type of the activity, and by extracting a pattern of the events. Here, the meaningful activity may include practical conclusions that may be inferred from the detected events. For example, the meaningful activity may exclude noise, a false alarm, and the like, occurring due to an element, such as specification of a sensor and an illumination condition that gives an adverse effect on an object detection.

In one exemplary embodiment, the event signal processing apparatus refers to an apparatus for processing an event signal and may be configured using, for example, a software module, a hardware module, or various combinations thereof. The event signal processing apparatus may analyze an event based on an event signal output from an event based sensor. Alternatively, to provide processed information to an application for analyzing events, the event signal processing apparatus may be a preprocessing apparatus configured to preprocess an event signal output from the event based sensor. The event signal processing apparatus may be configured as a software module and be applied to the event based sensor, and may be configured as a hardware module to be directly employed for logic of the event based sensor. Alternatively, the event signal processing apparatus may be configured as a separate hardware device independent from the event based sensor. A method of configuring the event signal processing apparatus may be variously applied or modified based on the design intent.

The event based sensor may detect an event using a plurality of sensing pixels, and output an event signal based on an output signal of a sensing pixel used to detect the event. A sensing pixel at which an event is detected among the plurality of sensing pixels is referred to as an active pixel. The active pixel is activated in response to detecting a desired (or, alternatively, predetermined) event, and the activated active pixel outputs an activation signal. The event based sensor may create an event signal based on the activation signal output from the active pixel among the plurality of sensing pixels, and output the created event signal. The event based sensor responds to an event in which a change in brightness detected at a sensing pixel is greater than or equal to a threshold, and outputs event signals based on activation signals output from activated sensing pixels.

In one exemplary embodiment, an image created based on event signals output in response to the event based sensor detecting the flow of events may include approximate information about a counter of a moving object and may not include detailed information about color, a texture, and the like. Here, the flow of events may include the time sequential flow of events detected at sensing pixels of the event based sensor. For example, in response to events, for example, a change in light, detected at the event based sensor, the flow of the events may be represented as a vector of optical flow. The event based sensor may include a dynamic vision sensor (DVS).

The term "event" used herein refers to a phenomenon detected at sensing pixels, and each of the sensing pixels may detect a desired (or, alternatively, predetermined) event and output an activation signal. An event detected at a sensing pixel may be variously defined based on a type of the event based sensor. For example, the event based sensor may detect an event that intensity of light incident to the plurality of sensing pixels varies. Also, the event may be defined as a change in a frequency, intensity of wave, a magnitude of power, and the like, and may be applied to the event based sensor. A quantitative relationship that defines the event may be variously applied or modified.

Events detected at the event based sensor may occur due to a variety of scenarios. For example, in response to a movement of an object within the detection range of the event based sensor, in response to an autonomous movement of the event based sensor, in response to a change in light projected toward an object present within the detection range of the event based sensor, or in response to a change in light generated from a luminous body present within the detection range of the event based sensor varies, sensing pixels of the event based sensor may detect such events.

Sensing pixels of the event based sensor may detect an event that satisfies a desired (or, alternatively, predetermined) condition. For example, sensing pixels of the event based sensor may detect an event that a change in intensity of incident light is greater than or equal to a threshold, and output an activation signal. The event based sensor may output an event signal based on an activation signal output from a sensing pixel. The event signal may include information, for example, an address of an active pixel, coordinates or an index of the active signal, etc., used to identify the active pixel that outputs the activation signal, and time information, for example, a timestamp, etc., about a time at which the event is detected at the active pixel. The event signal may further include a type of the event, for example, polarity information, etc. The event based sensor may identify the active pixel at which the event is detected, based on coordinates of the active pixel that are included in the event signal, and acquire a time at which the event is detected at the active pixel based on the timestamp included in the event signal.

The event based sensor may output event signals using a serial communication type. The event based sensor may detect an event based on a preset sensing unit. For example, if the event based sensor is configured to detect an event based on a micro second unit, the event based sensor may output discrete event signals based on the micro second unit. A timestamp corresponding to the event may be a value of a time represented as the micro second unit. As described above, each of the event signals includes identification information of an active pixel at which a corresponding event is detected. Thus, the event signal processing apparatus may identify an active pixel corresponding to the event signal.

Figure 2:
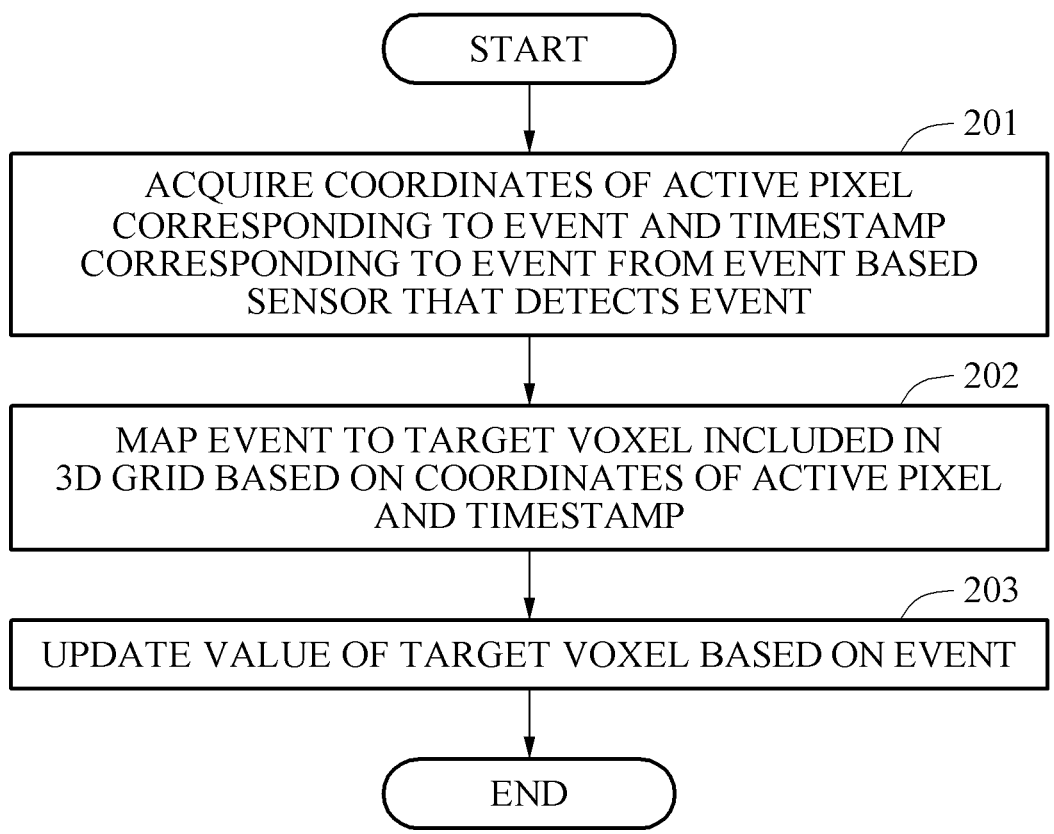
FIG. 2 is a flowchart illustrating an event signal processing method according to an exemplary embodiment.

FIG. 2 is a flowchart illustrating an event signal processing method according to an exemplary embodiment.

Referring to FIG. 2, in operation 201, an event signal processing apparatus may acquire coordinates of an active pixel corresponding to an event and a timestamp corresponding to the event from an event based sensor that detects the event. The active pixel at which the event is detected among sensing pixels of the event based sensor may output an activation signal. The event based sensor may output an event signal based on the activation signal. Here, the event signal may include an address of the active pixel and the timestamp indicating a time at which the event is detected. The event signal processing apparatus may acquire the event signal from the event based sensor, and acquire the coordinates of the active pixel and the timestamp among the sensing pixels based on the acquired event signal.

In operation 202, the event signal processing apparatus may map the event to a target voxel included in a 3D grid based on the coordinates of the active pixel and the timestamp. Here, the 3D grid refers to a set of voxels identified based on a 3D index, and may include, for example, voxels identified based on a coordinate of x axis, a coordinate of y axis, and a coordinate of t axis. The x axis and y axis may contain a positional or spatial meaning, and t axis may contain a temporal meaning. A size of the 3D grid may be defined based on a number of voxels of x axis, a number of voxels of y axis, and a number of voxels of t axis. For example, the 3D grid may be represented as (number of voxels of x axis)* (number of voxels of y axis)*(number of voxels of t axis). The size of the 3D grid is scalable and thus, may be variously applied or modified based on design intent. The 3D grid defined based on the size of the 3D grid may identify voxels using a quantized index.

The event signal processing apparatus may convert the coordinates of the active pixel and the timestamp to coordinates of the target voxel based on a size of the 3D grid and a resolution of the event based sensor. Here, the target voxel denotes a voxel to which the event is mapped among voxels of the 3D grid. The resolution of the event based sensor may be defined based on a number of sensing pixels of the event based sensor, and may be represented as (number of columns)*(number of rows) of a pixel plane that includes the sensing pixels. The number of columns may correspond to a width and the number of rows may correspond to a height. For example, the resolution of the event based sensor may be represented as 640*480.

The event signal processing apparatus may acquire a coordinate of x axis and a coordinate of y axis of the 3D grid by scaling coordinates of an active pixel corresponding to an event. The event signal processing apparatus may acquire a coordinate of t axis of the 3D grid by quantizing a timestamp corresponding to the event. The event signal processing apparatus may specify a target voxel to which the event is to be mapped based on the acquired coordinates. An exemplary embodiment of mapping an event to a target voxel will be described with reference to FIGS. 3 and 4.

In operation 203, the event signal processing apparatus may update a value of the target voxel based on the event. The event signal processing apparatus may update the value of the target voxel based on an event mapping result. For example, the event signal processing apparatus may count a number of mappings and update the value of the target voxel based on the counted number of mappings. Alternatively, the event signal processing apparatus may compare a number of events mapped to the target voxel to a threshold, and update a value of the target voxel based on the comparison result. An exemplary embodiment of updating a value of a target voxel will be described with reference to FIGS. 3 and 4.

Figure 3:
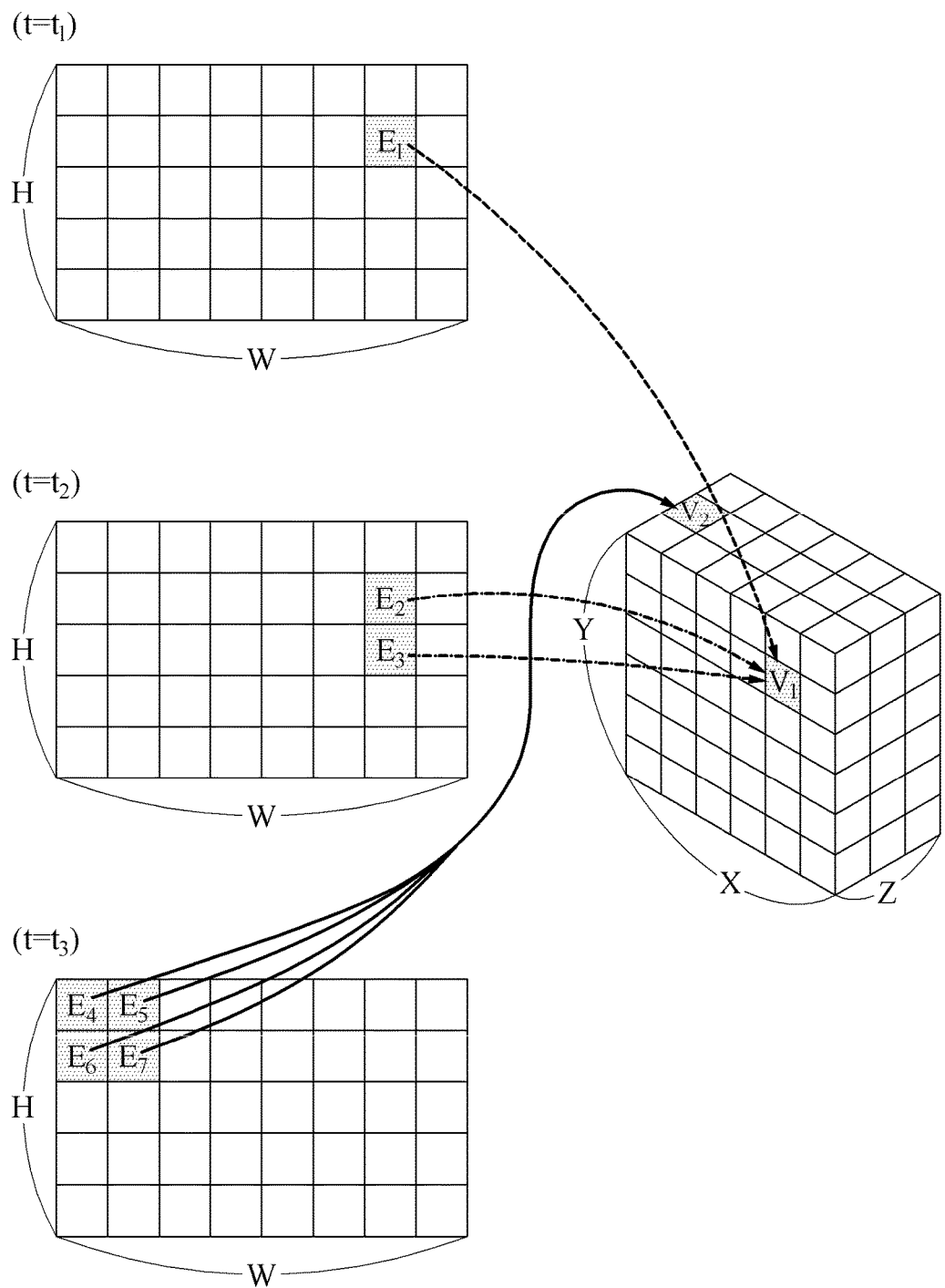
FIG. 3 illustrates an example of describing a three-dimensional (3D) grid updating process according to an exemplary embodiment.

FIG. 3 illustrates an example of describing a 3D grid updating process according to an exemplary embodiment.

Referring to FIG. 3, the event signal processing apparatus may map events $E_1$ to $E_7$ to voxels $V_1$ and $V_2$ of the 3D grid. Herein, a resolution of an event based sensor is W*H, and sensing pixels of the event signal processing apparatus may be identified based on coordinates of (x, y) of a two-dimensional (2D) pixel plane. An event E detected at an active pixel present at coordinates of (x, y) at a time t may be represented as (x, y, t). Here, t denotes a timestamp. Accordingly, $E_1$ denotes an event detected at the active pixel at $t_1$, $E_2$ and $E_3$ denote events detected at active pixels at $t_2$, and $E_4$ to $E_7$ denote events detected at active pixels at $t_3$.

Referring to FIG. 3, the 3D grid has a size of X*Y*Z. The event signal processing apparatus may select a single time slot from among Z time slots based on the timestamp, and classify W*H sensing pixels into X*Y voxels corresponding to the selected time slot. Here, the 3D grid may be configured using a circular queue. For example, an array that includes X*Y voxels may be set with respect to each of the Z time slots, and arrays corresponding to the Z time slots may be cyclically selected over time. Alternatively, Z voxels having the same location on an XY plane of the 3D grid may be configured as a circular queue with the size of Z. Here, X*Y circular queues each with the size of Z may be set.

Because X, Y, and Z that define the size of the 3D grid are scalable, the event signal processing apparatus may adjust X, Y, and Z based on design intent. For example, the event signal processing apparatus may create the 3D grid with the size of X*Y*Z in which each voxel has a size of (W/X)*(H/Y)*1 using the resolution W*H of the event based sensor.

Referring to FIG. 3, the event signal processing apparatus may map the events $E_1$, $E_2$, and $E_3$ to the voxel $V_1$ and map the events $E_4$, $E_5$, $E_6$, and $E_7$ to the voxel $V_2$ based on the resolution, W*H, of the event based sensor and the size, X*Y*Z, of the 3D grid. The event signal processing apparatus may convert coordinates of an active pixel corresponding to an event and a timestamp corresponding to the event to coordinates of a target voxel.

For example, the event signal processing apparatus may convert coordinates of (x, y, t) corresponding to the event E to [x/(W/X), y/(H/Y), t % Z] based on the resolution, W*H, of the event based sensor and the size, X*Y*Z, of the 3D grid. Here, if a value of x/(W/X) or y/(H/Y) is a real number, the event signal processing apparatus may use the value of x/(W/X) or y/(H/Y) as coordinates of a target voxel through rounding off, truncation, or raising to a unit. Also, % denotes a modulo operator. The time stamp t may be a real number and Z may be an integer or a natural number. In this case, t % Z may be a real number, for example, 10.4%3=1.4. Thus, the event signal processing apparatus may calculate a value of t % Z by converting the value of t % Z to an integer or a natural number or by converting a value of t to an integer or a natural number. For example, the event signal processing apparatus may convert a value of t % Z to a natural number or an integer, for example, 1.4 to 1, through rounding off, truncation, and raising to a unit. Alternatively, the event signal processing apparatus may convert a value of t to a natural number or an integer through rounding off, truncation, and raising to a unit, and then may calculate a value of t % Z, for example, 10%3=1.

In one exemplary embodiment, Z may be set based on a sensing unit of the event based sensor. For example, once the event based sensor detects an event based on a micro second unit, a timestamp output from the event based sensor may have a value of the micro second unit. Z may be set by scaling a micro second. For example, the event signal processing apparatus may perform operation processing of a value of T, for example, t/10 and the like, based on a scaling parameter of a temporal axis, and convert the operation processed value of t to coordinates of the target voxel. Here, a scheme of defining the size of the 3D grid or a scheme of calculating coordinates of a target voxel corresponding to an event is not limited thereto and may be variously modified or applied.

The event signal processing apparatus may map the event E identified based on (x, y, t) to a target voxel having coordinates of [x/(W/X), y/(H/Y), t % Z] among voxels of the 3D grid. The event signal processing apparatus may map the events $E_1$ to $E_3$ to the voxel $V_1$ and map the events $E_4$ to $E_7$ to the voxel $V_2$, using an operator of [x/(W/X), y/(H/Y), t % Z].

In one exemplary embodiment, the event signal processing apparatus may update values of target voxels of the 3D grid based on a mapping result of events. The event signal processing apparatus may count a number of events to be mapped to a target voxel and update a value of the target voxel based on the counted number of events. For example, the event signal processing apparatus may determine the value of the target voxel as a preset value based on whether the number of events mapped to the target voxel is greater than a threshold. Alternatively, the event signal processing apparatus may determine the value of the target voxel by scaling the number of events mapped to the target voxel or by quantizing the number of events mapped to the target voxel using a desired (or, alternatively, predetermined) scheme.

Referring to FIG. 3, because three events are mapped to a target voxel, for example, the voxel $V_1$, the event signal processing apparatus may update a value of $V_1$ with a value corresponding to 3. Also, because four events are mapped to a target voxel, for example, the voxel $V_2$, the event signal processing apparatus may update a value of $V_2$ with a value corresponding to 4. If an updating condition is set to update a value of a target voxel with α in response to the number of events mapped to the target voxel being greater than 3, the event signal processing apparatus may update the value of $V_2$ with α instead of updating the value of $V_1$. A method of updating a value of a target voxel is not limited thereto and may be variously modified and applied.

Figure 4:
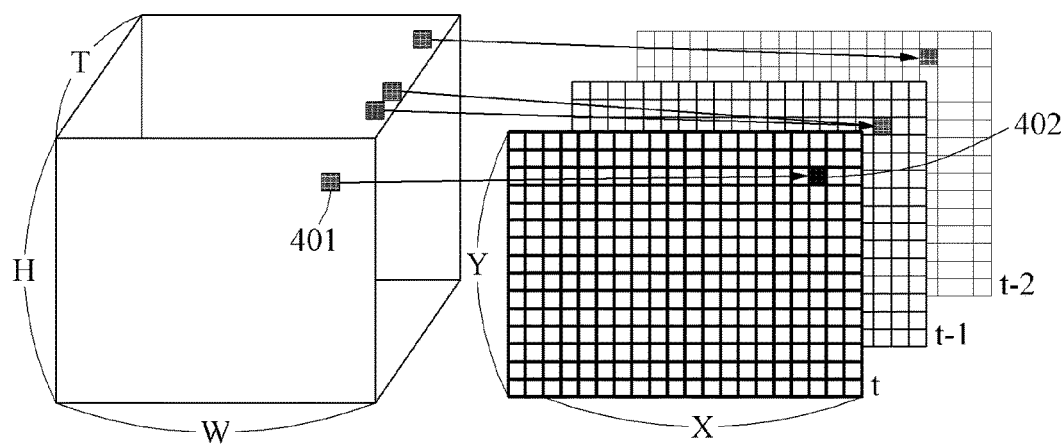
FIG. 4 illustrates another example of describing a 3D grid updating process according to an exemplary embodiment.

FIG. 4 illustrates an example of describing a 3D grid updating process according to an exemplary embodiment.

Referring to FIG. 4, the event signal processing apparatus may map an event E 401 represented as (x, y, t) to a target voxel 402 of a 3D grid. The event signal processing apparatus may calculate a value $\text{Grid}_{index}(x, y, t | X, Y, \tau, \theta_1, \alpha)$ of the target voxel 402 according to Equation 1.

$$\text{Grid}_{index}(x, y, t \mid X, Y, \tau, \theta_1, \alpha) = \left[ \int_t^{t+\tau} \int_h^{h+\frac{H}{Y}} \int_w^{w+\frac{W}{X}} E(x, y, t) dx dy dt \right] - \theta_1 \quad \text{[Equation 1]}$$

In Equation 1, x, y, and t denote coordinates of x axis, y axis, and t axis, respectively, X and Y denote a number of voxels of x axis of the 3D grid and a number of voxels of y axis of the 3D grid, respectively, and τ denotes a size of a t-axial direction of each voxel. Also, $\theta_1$ and α denote parameters used to calculate the value of the target voxel 402. W and H denote a number of columns and a number of rows of the event based sensor, respectively. Referring to Equation 1, the event signal processing apparatus may count a number of events being occurred during a predetermined period of time in a desired space, in order to calculate a value of a target voxel.

The event signal processing apparatus may calculate the value of the target voxel 402 according to Equation 2.

if $\text{Grid}_{index}(x,y,t|X,Y,\tau,\theta_1,\alpha)<0$, $\text{Grid}_{index}(x,y,t|X,Y,\tau,\theta_1,\alpha)=\alpha$ [Equation 2]

If the condition of Equation 2 is satisfied, the event signal processing apparatus may determine $\text{Grid}_{index}$(x, y, t|X, Y, τ, $\theta_1$, α) as α.

In one exemplary embodiment, the event signal processing apparatus may detect an activity associated with events based on values of voxels of the 3D grid. For example, the event signal processing apparatus may determine whether values of voxels of the 3D grid satisfy a desired condition corresponding to the activity by adding up values of voxels of the 3D grid, by analyzing the distribution of values of voxels, or by counting a number of voxels having values being greater than a threshold, or the like. In response to values of voxels of the 3D grid that satisfy the desired condition, the event signal processing apparatus may trigger detection of the activity. Also, values of voxels of the 3D grid may be analyzed using a separate module or application independent from the event signal processing apparatus. In this case, the event signal processing apparatus may create the 3D grid by preprocessing event signals and provide the created 3D grid to an external module.

In one exemplary embodiment, the event signal processing apparatus may detect an activity associated with events based on values of voxels of the 3D grid, and switch a mode of the event based sensor in response to the detected activity. Here, a mode of the event based sensor may include a low energy mode that is a state in which an event is detected at only a portion of sensing pixels of the event based sensor, and a full resolution mode that is a state in which an event is detected at all of the sensing pixels of the event based sensor. In response to detection of the activity, the event signal processing apparatus may switch the mode of the event based sensor from the low energy mode to the full resolution mode. For example, if the event based sensor has a resolution of 640*480, the event signal processing apparatus may detect an activity and switch the low energy mode of the event based sensor that operates at the resolution of ⅛ to the full resolution mode. Here, the mode of the event based sensor may be variously defined. Although only an exemplary embodiment of switching from the lower energy mode to the full resolution mode is described herein, an exemplary embodiment of switching from the full resolution mode to the low energy mode may be applied. Also, exemplary embodiments combining various modes may be applied.

Figure 5:
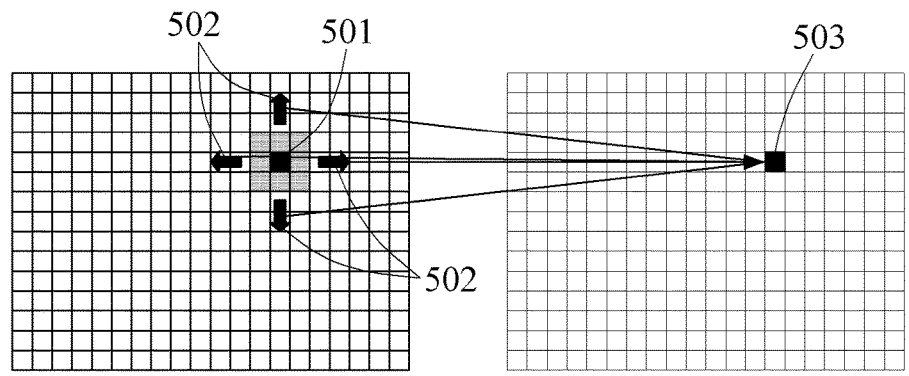
FIG. 5 illustrates an example of describing a scheme of creating a new 3D grid according to an exemplary embodiment.

FIG. 5 illustrates an example of describing a scheme of creating a new 3D grid according to an exemplary embodiment.

The event signal processing apparatus according to an exemplary embodiment may create a new 3D grid based on spatial correlations between voxels of a 3D grid. Here, the new 3D grid is a 3D grid that is distinguished from a 3D grid created by mapping events, and refers to a 3D grid that is newly created by processing the pre-created 3D grid. The event signal processing apparatus may calculate spatial correlations based on values of voxels of the 3D grid described above with FIGS. 1 through 4, and create the new 3D grid based on the calculated spatial correlations.

Referring to FIG. 5, the event signal processing apparatus may measure spatial correlations 502 between a second target voxel 501 among voxels of the 3D grid and neighboring voxels of the second target voxel 501. Here, the neighboring voxels may be voxels adjacent to the second target voxel 501 within a preset range. The preset range may include a range of x axis and a range of y axis.

The event signal processing apparatus may determine a value of a voxel 503 corresponding to the second target voxel 501 among voxels of the new 3D grid based on the spatial correlations 502 between the second target voxel 501 and the neighboring voxels. For example, the spatial correlations 502 may be defined based on differences between values of voxels having the same coordinate of t axis.

The event signal processing apparatus may calculate a value, $Grid_{spatial}(x, y, t|\theta_2, \beta)$, of the voxel 503 corresponding to the second target voxel 501 according to Equation 3.

$$Grid_{spatial}(x,y,t|\theta_2,\beta)=Grid_{index}(x,y,t)dxdy \quad \text{[Equation 3]}$$

In Equation 3, x, y, and t denote coordinates of the second target voxel 501, $Grid_{index}(x, y, t)dxdy$ denotes a variation in the value of the second target voxel 501 on x axis and y axis, and $\theta_2$ and $\beta$ denote parameters used to calculate the value of the voxel 503 corresponding to the second target voxel 501.

The event signal processing apparatus may calculate the value of the voxel 503 corresponding to the second target voxel 501 according to Equation 4.

$$\text{if } |Grid_{spatial}(x,y,t|\theta_2,\beta)|<\theta_2, Grid_{spatial}(x,y,t|\theta_2,\beta)=\beta \quad \text{[Equation 4]}$$

The event signal processing apparatus may compare $Grid_{spatial}(x, y, t|\theta_2, \beta)$ to a threshold $\theta_2$, and may determine $Grid_{spatial}(x, y, t|\theta_2, \beta)$ as $\beta$ if the comparison result satisfies the condition of Equation 4.

The size of the new 3D grid may be set to be the same as the size of the pre-created 3D grid or to be scalable. Accordingly, the voxel 503 corresponding to the second target voxel 501 among the voxels of the new 3D grid may have the same coordinates as coordinates of the second target voxel 501 based on design intent, and may be quantized using a variety of schemes.

The 3D grid created based on the spatial correlations 502 may represent a variation of events in the same time zone. Thus, the event signal processing apparatus may detect an activity corresponding to the events by analyzing values of voxels of the new 3D grid, or filter out events determined as noise by processing events not corresponding to the activity as noise or a false alarm. The event signal processing apparatus may extract a pattern corresponding to the false alarm from the new 3D grid, and determine events corresponding to the extracted pattern as noise. The event signal processing apparatus may create the new 3D grid representing the variation of events, and store the created new 3D grid in a memory. The event signal processing apparatus may analyze information, such as quadratic differential and the like, or calculate a dispersion and an average based on the created new 3D grid or the stored new 3D grid.

Figure 6:
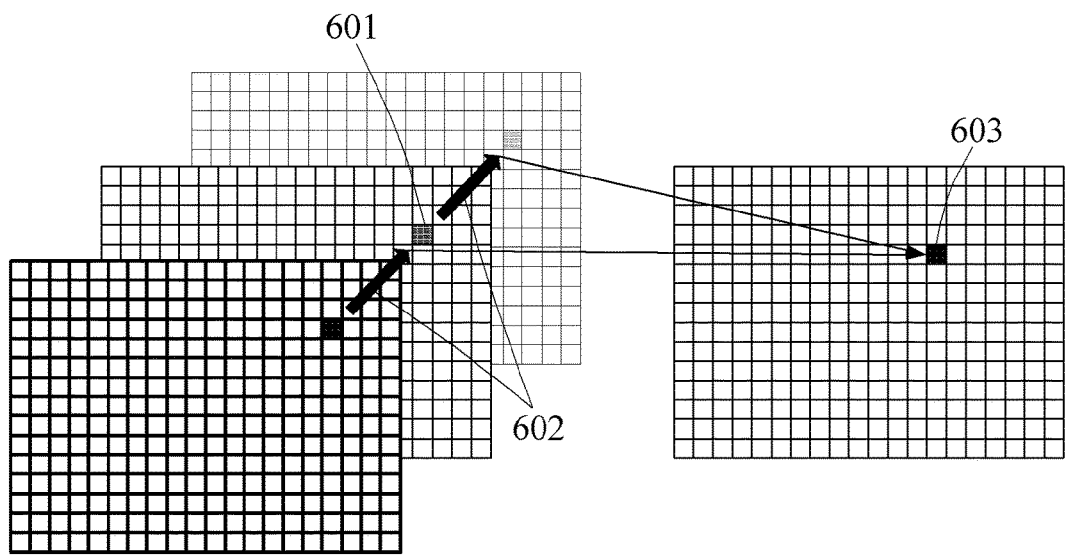
FIG. 6 illustrates another example of describing a scheme of creating a new 3D grid according to an exemplary embodiment.

FIG. 6 illustrates another example of describing a scheme of creating a new 3D grid according to an exemplary embodiment.

The event signal processing apparatus may create a new 3D grid based on temporal correlations between voxels of a 3D grid. Here, the new 3D grid is a 3D grid that is distinguished from a 3D grid that is created by mapping events, and refers to a 3D grid that is newly created by processing the pre-created 3D grid. The event signal processing apparatus may calculate the temporal correlations based on values of voxels of the 3D grid described above with FIGS. 1 through 4, and create the new 3D grid based on the calculated temporal correlations.

Referring to FIG. 6, the event signal processing apparatus may measure temporal correlations 602 between a second target voxel 601 among voxels of the 3D grid and neighboring voxels of the second target voxel 601. Here, the neighboring voxels may be voxels having the same coordinate of x axis and coordinate of y axis as those of the second target voxel 601 and adjacent to the second target voxel 601 within a preset range among the voxels of the 3D grid. The preset range may include the range of t axis.

The event signal processing apparatus may update a value of a voxel 603 corresponding to the second target voxel 601 among voxels of the new 3D grid based on the temporal correlations 602 between the second target voxel 601 and the neighboring voxels. For example, the temporal correlations 602 may be defined based on differences between values of voxels having the same coordinate of x axis and coordinate of y axis as those of the second target voxel 601.

The event signal processing apparatus may calculate a value, $Grid_{temporal}(x, y, t|\theta_3, \gamma)$, of the voxel 603 corresponding to the second target voxel 601 according to Equation 5.

$$Grid_{temporal}(x,y,t|\theta_3,\gamma)=Grid_{index}(x,y,t)dt \quad \text{[Equation 5]}$$

In Equation 5, x, y, and t denote coordinates of the second target voxel 601, $Grid_{index}(x, y, t)dt$ denotes a variation in the value of the second target voxel 601 on t axis, and $\theta_3$ and $\gamma$ denote parameters used to calculate the value of the voxel 603 corresponding to the second target voxel 601.

The event signal processing apparatus may calculate the value of the voxel 603 corresponding to the second target voxel 601 according to Equation 6.

$$\text{if } |Grid_{temporal}(x,y,t|\theta_3,\gamma)|<\theta_3, Grid_{temporal}(x,y,t|\theta_3,\gamma)=\gamma \quad \text{[Equation 6]}$$

The event signal processing apparatus may compare $Grid_{temporal}(x, y, t|\theta_3, \gamma)$ to a threshold $\theta_3$, and determine $Grid_{temporal}(x, y, t|\theta_3, \gamma)$ as $\gamma$ if the comparison result satisfies the condition of Equation 6.

The aforementioned exemplary embodiment of FIG. 5 may be applied to a scheme of defining the new 3D grid or a scheme of setting coordinates of the voxel 603 corresponding to the second target voxel 601.

The 3D grid created based on the temporal correlations 602 may represent a variation of events present at the same location. Thus, the event signal processing apparatus may analyze the new 3D grid by applying the exemplary embodiment of FIG. 5.

In one exemplary embodiment, if a variation of events is same during a long period of time, or if events continuously occur, the event signal processing apparatus may analyze the new 3D grid and process the events as not an activity but a noise. For example, if values of contiguous voxels having the same coordinate of x axis and coordinate of y axis among voxels of the new 3D grid created based on temporal correlations are equal to each other, the event signal processing apparatus may determine events corresponding to the contiguous voxels as a noise.

In one exemplary embodiment, if variations of events exceed a specific threshold and events of which variations exceed the specific threshold continue during a specific period of time, the event signal processing apparatus may determine the events as an activity. For example, if values of contiguous voxels having the same coordinate of x axis and coordinate of y axis among voxels of the new 3D grid created based on temporal correlations are greater than a threshold and a number of contiguous voxels is greater than a preset number, the event signal processing apparatus may determine events corresponding to the contiguous voxels as an activity.

As described above with reference to FIGS. 5 and 6, the event signal processing apparatus may create a new 3D grid based on values of voxels of a pre-created 3D grid. The event signal processing apparatus may calculate a difference between a value of a second target voxel and a value of a neighboring voxel, and compare the calculated difference to a threshold. The event signal processing apparatus may update a value of a voxel corresponding to the second target voxel among voxels of the new 3D grid based on the comparison result. Also, the event signal processing apparatus may detect an activity by analyzing the new 3D grid. For example, if a number of voxels having values greater than a threshold among voxels of the new 3D grid is greater than a preset number, the event signal processing apparatus may detect the activity. The event signal processing apparatus may extract a feature corresponding to the events based on values of voxels of the new 3D grid, and classify a type of an activity corresponding to the events based on the extracted feature. The event signal processing apparatus may acquire variations of events from the new 3D grid, and extract an optical flow from the acquired variations of the events. The event signal processing apparatus may detect the activity corresponding to the events or identify the type of the activity based on a feature of the optical flow.

Figure 7:
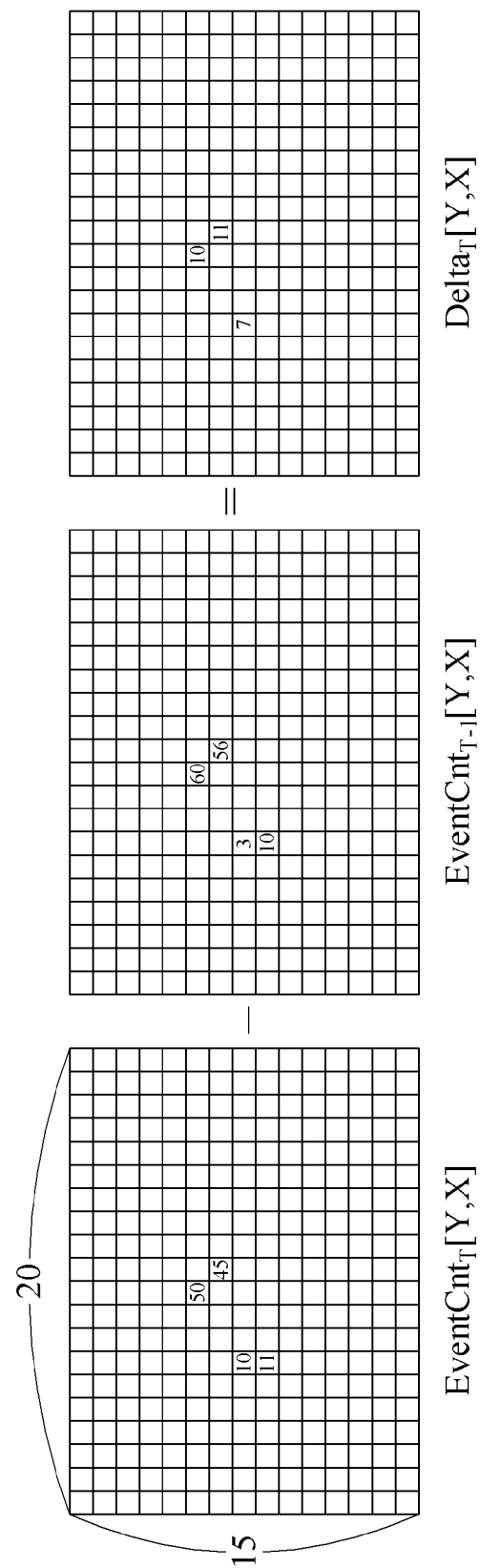
FIG. 7 illustrates an example of describing an activity detection process according to an exemplary embodiment.

FIG. 7 illustrates an example of describing an activity detection process according to an exemplary embodiment.

In a 3D grid according to an exemplary embodiment, values of voxels may be defined based on a number of events that are mapped to voxels. Referring to FIG. 7, values of voxels at a time T among voxels of the 3D grid may be defined as a number of events. The event signal processing apparatus may acquire values $EventCnt_T[Y,X]$ of the respective voxels at the time T and values $EventCnt_{T-1}[Y,X]$ of the respective voxels at a time T−1. The event signal processing apparatus may calculate variations $Delta_T[Y,X]$ of events corresponding to the time T based on the difference between $EventCnt_T[Y,X]$ and $EventCnt_{T-1}[Y,X]$. $Delta_T[Y,X]$ may be expressed by Equation 7.

$$Delta_T[Y,X]=EventCnt_T[Y,X]-EventCnt_{T-1}[Y,X] \quad \text{[Equation 7]}$$

The event signal processing apparatus may compare values of the respective voxels that belong to $Delta_T[Y,X]$ to a threshold, and detect an activity corresponding to the events. For example, if a number of voxels having values greater than $\theta_2$ among values of the respective voxels that belong to $Delta_T[Y,X]$ is greater than a preset number Threshold2, the event signal processing apparatus may determine the events as an activity. Referring to FIG. 7, $\theta_2$=5, Threshold2=2, and the number of voxels having values greater than 5 among voxels of $Delta_T[Y,X]$ is 3. Thus, the event signal processing apparatus may detect the activity by analyzing the 3D grid.

Figure 8:
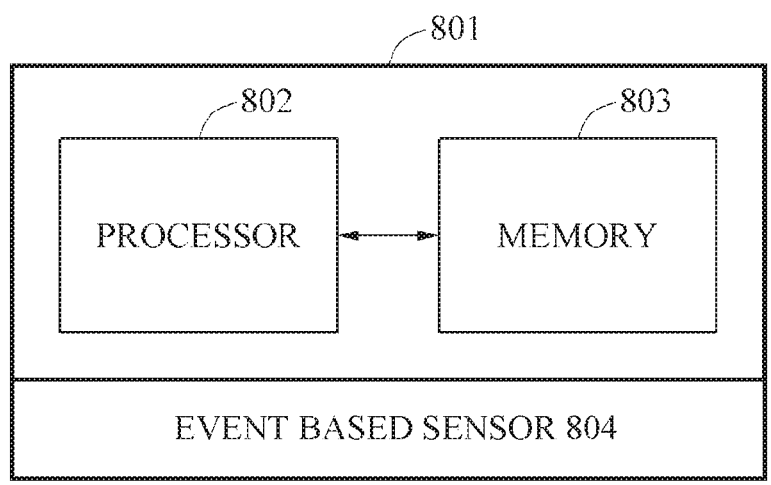
FIG. 8 is a block diagram illustrating an event signal processing apparatus according to an exemplary embodiment.

FIG. 8 is a block diagram illustrating an event signal processing apparatus according to an example embodiment.

Referring to FIG. 8, an event signal processing apparatus 801 may include a processor 802 and a memory 803. The memory 803 may record a program for processing an event signal, and record instructions to execute the operations described above with FIGS. 1 through 7. The memory 803 may store information associated with a sequentially occurring event from an event based sensor 804, and store information associated with a 3D grid or a new 3D grid created at the processor 802.

The processor 802 may load and execute the program recorded in the memory 803. The processor 802 may acquire coordinates of an active pixel corresponding to an event and a timestamp corresponding to the event from the event based sensor that detects the event, and map the event to a target voxel included in the 3D grid based on the coordinates of the active pixel and the timestamp, and update a value of the target voxel based on the event. Also, the processor 802 may acquire a 3D grid that is defined based on a number of events mapped to voxels among events detected at the event based sensor, and create a new 3D grid based on spatial correlations or temporal correlations between a target voxel among voxels of the 3D grid and neighboring voxels of the target voxel. Here, the aforementioned exemplary embodiments may be applicable to the operations of the event signal processing apparatus 801. Thus, a repeated description will be omitted.

Because the event based sensor outputs an event signal in response to only an event, the event based sensor shows low energy consumption, which differs from a frame image based sensor. Also, the event based sensor may satisfactorily detect an event even in an environment in which a lighting condition is wide and a light source is weak. Due to a low energy consumption of the event based sensor, a terminal, such as a mobile device, may switch from a standby state to an operation state and quickly collect an event signal. For example, the event based sensor may be suitable for immediate response when the user is to unlock a terminal. Here, there is a need to identify whether an event is an activity or a noise based on the event signal output from the event based sensor. If events are individually analyzed to detect an activity, it may cause great burden of load. The event signal processing apparatus may compress event information using a scalable 3D grid, measure correlations of the 3D grid, and create a new 3D grid for additional analysis. The event signal processing apparatus may quickly filter out an event corresponding to noise, decrease a processing rate for analyzing event signals, and cache information associated with the events and use the cached information for analysis. The event signal processing apparatus may be applicable to detect or determine an activity of an object, such as a person, a thing, etc. Also, the event signal processing apparatus may be directly configured on a logic of a sensor, and operate on a consumer electronics (CE) device such as a mobile phone/TV, and devices such as a vehicle, a drone, a closed circuit television (CCTV), an outdoor signboard, and the like, due to characteristics of low power consumption and low computing amount. The event signal processing apparatus may provide a function of switching from a sleep mode to a wake mode in response to detecting an activity, and provide a function of triggering a service that is distinguished based on a type of the activity.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

In addition, the exemplary embodiments may also be implemented through computer-readable code and/or instructions on a medium, e.g., a computer-readable medium, to control at least one processing element to implement any of the above-described exemplary embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of processing an event signal, the method comprising:
    acquiring, from a dynamic vision sensor configured to detect an event corresponding to a change of light by a movement of an object and generate a timestamp corresponding to the event, first and second coordinates of an active pixel corresponding to the event and the timestamp corresponding to the event;
    mapping the first and second coordinates of the active pixel and the timestamp, to a target voxel included in a three-dimensional (3D) grid;
    updating a value of the target voxel based on a number of mapping to the target voxel; and
    determining an activity associated with the event, based on spatial correlations and temporal correlations between the target voxel and neighboring voxels of the target voxel in the 3D grid,
    wherein first and second coordinates of the target voxel are determined based on the first and second coordinates of the active pixel and a third coordinate of the target voxel is determined based on the timestamp.

2. The method of claim 1, wherein the mapping comprises converting the first and second coordinates of the active pixel and the timestamp into the first to third coordinates of the target voxel based on a size of the 3D grid and a resolution of the dynamic vision sensor.

3. The method of claim 2, wherein the 3D grid comprises voxels identified based on a coordinate of x axis, a coordinate of y axis, and a coordinate of t axis, and
    the size of the 3D grid is defined based on a number of voxels of x axis, a number of voxels of y axis, and a number of voxels of t axis.

4. The method of claim 1, wherein the updating comprises determining the value of the target voxel as a preset value in response to the number of mapping to the target voxel being greater than a threshold.

5. The method of claim 1, further comprising:
    when the number of the mapping to the target voxel is greater than a threshold, the activity associated with the event is determined.

6. The method of claim 1, wherein the active pixel is configured to output an activation signal,
    the dynamic vision sensor is further configured to output an event signal that includes the first and second coordinates of the active pixel and the timestamp indicating a time at which the event is detected, based on the activation signal, and
    the acquiring comprises:
    acquiring the event signal from the dynamic vision sensor;
    acquiring the first and second coordinates of the active pixel based on the event signal; and
    acquiring the timestamp based on the event signal.

7. The method of claim 6, further comprising:
    switching a mode of the dynamic vision sensor in response to the detected activity,
    wherein the mode comprises at least one of a low energy mode that is a state in which the event is detected at a portion of a plurality of sensing pixels of the dynamic vision sensor and a full resolution mode that is a state in which the event is detected at all of the plurality of sensing pixels.

8. The method of claim 1, further comprising:
    creating a new 3D grid based on spatial correlations or temporal correlations between a second target voxel among voxels of the 3D grid and neighboring voxels of the second target voxel.

9. The method of claim 8, wherein the creating comprises:
    measuring spatial correlations between the second target voxel and neighboring voxels having the same coordinate of t axis as that of the second target voxel among the voxels of the 3D grid; and
    updating a value of a voxel corresponding to the second target voxel among voxels of the new 3D grid based on the measured spatial correlations.

10. The method of claim 8, wherein the creating comprises:
   measuring temporal correlations between the second target voxel and neighboring voxels having the same coordinate of x axis and coordinate of y axis as those of the second target voxel among the voxels of the 3D grid; and
   updating a value of a voxel corresponding to the second target voxel among voxels of the new 3D grid based on the measured temporal correlations.

11. The method of claim 8, further comprising:
   determining events corresponding to contiguous voxels as a noise in response to values of the contiguous voxels having the same coordinate of x axis and coordinate of y axis among the voxels of the new 3D grid created based on the temporal correlations being equal to each other.

12. The method of claim 8, further comprising:
   determining events corresponding to contiguous voxels as an activity in response to values of the contiguous voxels having the same coordinate of x axis and coordinate of y axis among the voxels of the new 3D grid created based on the temporal correlations being greater than a threshold and a number of the contiguous voxels being greater than a preset number.

13. The method of claim 8, wherein the creating comprises:
   calculating a difference between a value of the second target voxel and a value of a neighboring voxel;
   comparing the calculated difference to a threshold; and
   updating a value of a voxel corresponding to the second target voxel among voxels of the new 3D grid based on a comparison result.

14. The method of claim 8, further comprising:
   detecting an activity in response to a number of voxels having a value greater than a threshold among voxels of the new 3D grid being greater than a preset number.

15. The method of claim 8, further comprising:
   extracting a feature corresponding to events based on values of voxels of the new 3D grid; and
   classifying a type of an activity corresponding to the events based on the feature.

16. A non-transitory computer-readable storage medium storing a program comprising instructions to control a processor to implement the method of claim 1.

17. An event signal processing apparatus comprising:
   a dynamic vision sensor configured to detect an event corresponding to a change of light by a movement of an object and generate a timestamp corresponding to the event; and
   a processor configured to:
   acquire, from the dynamic vision sensor, first and second coordinates of an active pixel corresponding to the event and the timestamp corresponding to the event;
   map the first and second coordinates of the active pixel and the timestamp, to a target voxel included in a three-dimensional (3D) grid;
   update a value of the target voxel based on a number of mapping to the target voxel; and
   determine an activity associated with the event, based on spatial correlations and temporal correlations between the target voxel and neighboring voxels of the target voxel in the 3D grid,
   wherein first and second coordinates of the target voxel are determined based on the first and second coordinates of the active pixel and a third coordinate of the target voxel is determined based on the timestamp.

18. The event signal processing apparatus of claim 17, wherein the processor is further configured to convert the coordinates of the active pixel and the timestamp into coordinates of the target voxel based on a size of the 3D grid and a resolution of the dynamic vision sensor,
   the 3D grid comprises voxels identified based on a coordinate of x axis, a coordinate of y axis, and a coordinate of t axis, and
   the size of the 3D grid is defined based on a number of voxels of x axis, a number of voxels of y axis, and a number of voxels of t axis.

* * * * *